United States Patent
Moreira et al.

(10) Patent No.: US 12,067,315 B2
(45) Date of Patent: Aug. 20, 2024

(54) DYNAMIC CONFIGURATION OF A PRINTER FOR A PRINTING OPERATION

(71) Applicant: ZEBRA TECHNOLOGIES CORPORATION, Lincolnshire, IL (US)

(72) Inventors: Joseph D. Moreira, Barrington, RI (US); Gene A. Hofer, Lake Zurich, IL (US); Michael T. Cranston, Carpentersville, IL (US); Duanfeng He, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/130,750

(22) Filed: Apr. 4, 2023

(65) Prior Publication Data
US 2023/0236780 A1 Jul. 27, 2023

Related U.S. Application Data

(63) Continuation of application No. 17/549,588, filed on Dec. 13, 2021, now Pat. No. 11,645,022.

(51) Int. Cl.
*G06F 3/12* (2006.01)

(52) U.S. Cl.
CPC .......... *G06F 3/1255* (2013.01); *G06F 3/1208* (2013.01); *G06F 3/1257* (2013.01); *G06F 3/1204* (2013.01)

(58) Field of Classification Search
None
See application file for complete search history.

(56) References Cited

U.S. PATENT DOCUMENTS

| | | | | |
|---|---|---|---|---|
| 2009/0079612 | A1* | 3/2009 | Parfitt | G05B 19/054 341/157 |
| 2019/0020787 | A1* | 1/2019 | Xu | B41J 2/2128 |
| 2020/0324486 | A1 | 10/2020 | Mantell et al. | |

OTHER PUBLICATIONS

International Search Report and Written Opinion for International Application No. PCT/US2022/50104 mailed on Dec. 20, 2022.

* cited by examiner

*Primary Examiner* — Darryl V Dottin

(57) ABSTRACT

In some implementations, a device may identify, for a printing operation, a media type associated with media involved in the printing operation. The device may receive, from a sensor, a sensor measurement associated with an ambient condition of the printer. The device may determine, using a print optimization model, a printing configuration for the printing operation based on the media type and the ambient condition, wherein the print optimization model is trained based on reference data associated with historical printing operations associated with one or more printers, wherein the reference data includes reference configurations associated with the historical printing operations, respective media types of media used in the historical printing operations, and corresponding ambient conditions of the one or more printers during the historical printing operations. The device may cause the printer to perform the printing operation according to the printing configuration.

21 Claims, 6 Drawing Sheets

DYNAMIC CONFIGURATION OF A PRINTER FOR A PRINTING OPERATION

RELATED APPLICATIONS

The present application is a continuation of U.S. patent application Ser. No. 17/549,588, filed on Dec. 13, 2021, which is incorporated by reference herein in its entirety.

BACKGROUND

Over time, wear and tear on a printer may degrade a quality of content printed by the printer and/or may cause printing anomalies that prevent the content from being legible or useable. For example, wear and tear on a barcode printer may prevent a barcode reader from being able to decode a barcode printed by the barcode printer. To ensure that a printer is capable of printing content with a certain level of quality, there is a need to detect or predict when a printer may require service or maintenance to avoid printing low-quality content (e.g., unreadable barcodes, unreadable text, low-resolution images, anomalous images, or other types of low-quality content).

SUMMARY

Some implementations described herein relate to a method for configuring a printer. The method may include identifying, by a device and for a printing operation, a media type associated with media involved in the printing operation. The method may include receiving, by the device and from a sensor, a sensor measurement associated with an ambient condition of the printer. The method may include determining, by the device and using a print optimization model, a printing configuration for the printing operation based on the media type and the ambient condition, where the print optimization model is trained based on reference data associated with historical printing operations associated with one or more printers, where the reference data includes reference configurations associated with the historical printing operations, respective media types of media used in the historical printing operations, and corresponding ambient conditions of the one or more printers during the historical printing operations. The method may include causing, by the device, the printer to perform the printing operation according to the printing configuration.

Some implementations described herein relate to a device. The device may include one or more memories and one or more processors coupled to the one or more memories. The device may be configured to identify, for a printing operation, a media type associated with media involved in a printing operation. The device may be configured to receive, from a sensor associated with a printer, a sensor measurement associated with an ambient condition of the printer. The device may be configured to determine, using a print optimization model, a printing configuration for the printing operation based on the media type and the ambient condition. The device may be configured to cause the printer to perform the printing operation according to the printing configuration.

Some implementations described herein relate to a tangible machine-readable medium that stores a set of instructions for a device. The set of instructions, when executed by one or more processors of the device, may cause the device to identify, for a printing operation, a media type associated with media involved in a printing operation. The set of instructions, when executed by one or more processors of the device, may cause the device to receive, from a sensor associated with a printer, a sensor measurement associated with an ambient condition of the printer. The set of instructions, when executed by one or more processors of the device, may cause the device to determine, using a print optimization model, a printing configuration for the printing operation based on the media type and the ambient condition. The set of instructions, when executed by one or more processors of the device, may cause the device to cause the printer to perform the printing operation according to the printing configuration.

DETAILED DESCRIPTION

Figure 1:
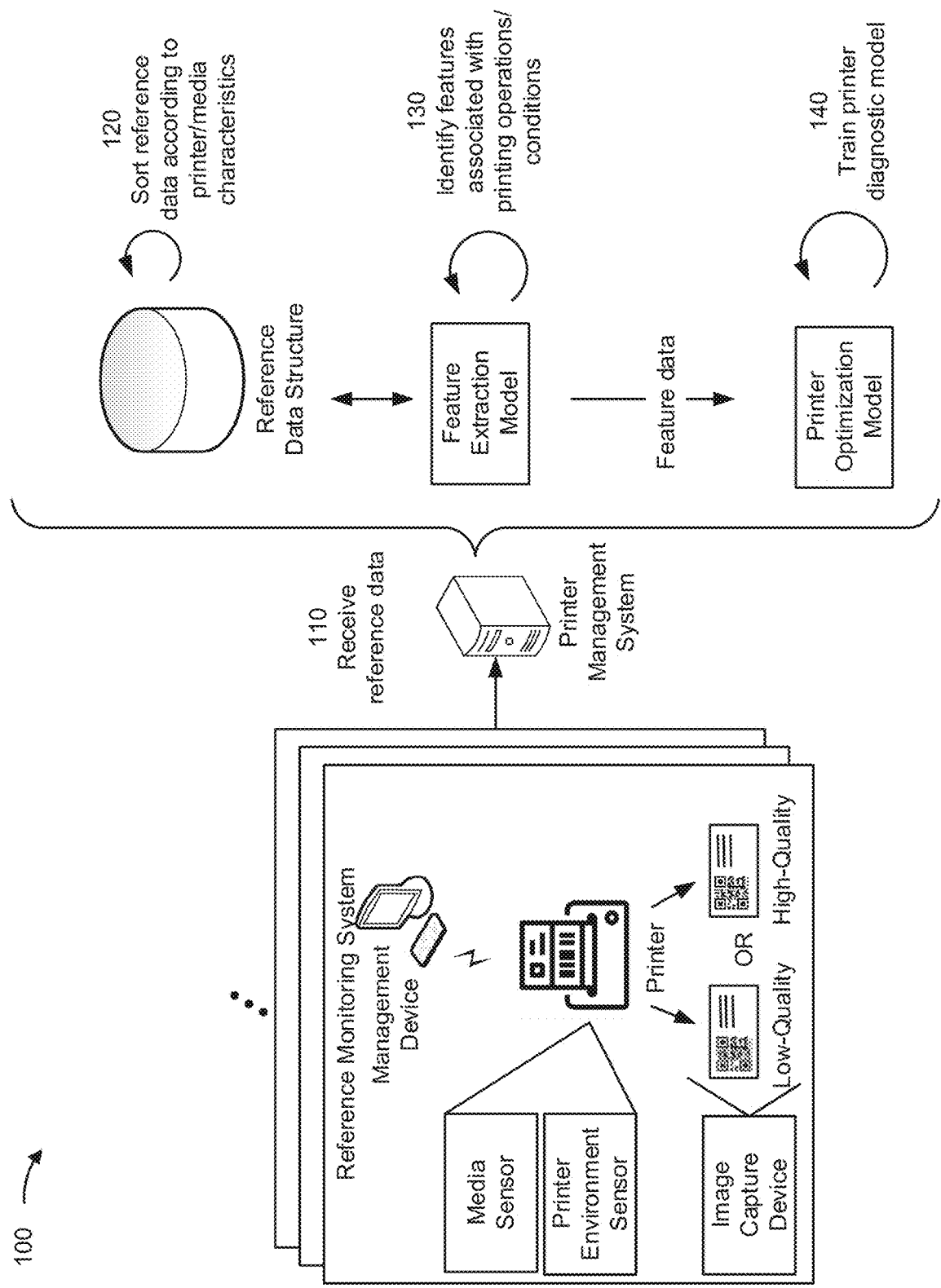
FIG. 1 is a diagram of an example implementation associated with a printer optimization model described herein.

The following detailed description of example implementations refers to the accompanying drawings. The same reference numbers in different drawings may identify the same or similar elements.

A printer may be used in a variety of applications to provide printed content on media (e.g., paper (rolls or individual sheets), cardboard, or other types of material). For example, a printer can print labels that are to be associated with objects in order to provide and/or indicate information associated with the objects (e.g., products, inventory, samples, supplies, consumables, and/or the like). In some instances, another device or system may be configured to read the labels in order to process the objects (e.g., to identify the objects, to sort the objects, to select the object for transportation, or to perform some other activity involving the object). Under certain conditions, a print quality of a label (or other content) may degrade. In some cases, certain conditions may contribute to the degradation of the printer and/or a performance of the printer over time (e.g., due to a rate of wear and tear on the printer increasing under those conditions). However, degradation of a print quality of a label and/or a performance of a printer may not be detected (e.g., by a technician and/or an automated self-maintenance operation) until an issue with the printer gets so severe that printed labels are undetectable and/or unreadable and/or that damage to the printer is irreversible. In such cases, the printer may need to be shut down for servicing, which results in delays and/or other costs associated with generating labels for objects or printing content on media. Further, a degradation may not be detected until the label is viewed by a user and/or read by a reader (e.g., a barcode reader or other type of device). In such a case, the user and/or barcode may be incapable of interpreting or reading content on the label, which may be degrade a user experience or involve a waste of resources associated with the reader.

In some cases, a system (e.g., a quality control system, a diagnostic system, a monitoring system, or the like) may utilize an image processing technique that analyzes an image of printed content to detect anomalies within the printed content. Such processing techniques can indicate that a printer may be experiencing an issue that will result in a low-quality label being printed or can predict that the printer is about to experience such an issue (e.g., based on detecting the anomaly). However, such processing techniques may not be configured to accurately indicate a particular type of issue that the printer may be experiencing or accurately determine whether the issue is related to a condition (e.g., a type of media being used, an ambient condition of a physical environment of the printer, and/or a physical condition of the printer) of the printer that is experiencing a particular problem. Accordingly, there is a need for a system that is capable of accurately detecting, based on an analysis of printed content and/or a sensed condition of a printer, that the printer that printed the content is experiencing or is likely to experience an issue (e.g., within a threshold time period or within a threshold quantity of printing operations).

Some implementations described herein provide a user device that utilizes one or more sensors to accurately determine and/or predict a status of a printer and configure the printer for a printing operation based on the status. For example, the user device may utilize media and/or environment data associated with a printer and/or a printing operation to determine the status of the printer. Based on the status, the user device may determine a printing configuration for the printing operation and cause the printer to perform the printing operation according to the printing configuration. In some implementations, a printer management system may provide a printer optimization model, to the user device, that is configured to determine the printing configuration based on a media type associated with the printing operation and/or an ambient condition that is sensed by a sensor associated with the printer. The printer optimization model may more accurately detect and/or predict an issue that is specifically associated with a media type and/or a sensed condition relative to other models that utilize only image processing techniques. In some implementations, the printer optimization model may utilize fewer resources relative to other models to detect or predict an issue associated with a printer based on identifying the media type (e.g., using a media authentication technique described herein) and/or a sensed condition of the printer to predict whether the printer may experience an issue during the printing operation or a subsequent printing operation.

In this way, a user device and/or a printer management system (and/or a printer), as described herein, may quickly and/or accurately detect an issue associated with the printer (and/or detect that the printer may experience an issue within a threshold period of time or within a threshold quantity of print operations) using sensor measurements and/or media types associated with printing operations performed by the printer or other printers (e.g., printers associated with historical printing operations that are used to train the printer optimization model as described herein). Accordingly, as described herein, the printer management system may reduce a likelihood that a printer experiences a severe enough issue that would require the printer to be shut down (e.g., during a production run), thereby improving efficiency of the printer (e.g., by enabling a dynamic reconfiguration of the printer and/or by enabling scheduling of maintenance to repair or replace a component of the printer during planned shutdowns or a slow production run) and enabling more accurate predictions for printer maintenance requirements and/or appropriately scheduled maintenance on certain components of the printer. Moreover, the user device and/or printer management system may analyze media data and/or sensor measurements that can more quickly or more accurately, relative to other systems, detect a likelihood that a printing operation may involve or result in printed content that includes a printing anomaly (e.g., a printing anomaly that is indicative of the printer experiencing a particular issue).

The printer may be a thermal printer that is configured to print content on thermal sensitive media using a thermal printhead. The thermal printhead may include an array of printing elements that print the content to the thermal sensitive media based on respective resistances of the printing elements (e.g., one or more resistors or other components with resistive properties) as the thermal sensitive media passes or comes into contact with the printing elements. The printer may cause the printing elements to have respective resistances according to print data associated with a printing instruction and/or printing operation. Certain conditions (e.g., ambient conditions of an environment of a printer, physical conditions of the printer, and or media conditions) can impact a performance of the printing elements. For example, a temperature or humidity of an environment of a printer can prevent one or more of the printing elements from reaching a configured temperature (or resistance) during a printing operation. Similarly, if the printer is exposed to a certain type of event and/or is mispositioned, the Newtonian effects on the printer can impact the performance of the printer or an ability of the printer to print on a certain type of media without experiencing an issue. For example, if the printer has been dropped, bumped, exposed to vibrations, or other types of movements, such events may cause the printer to have one or more physical conditions that may negatively impact the performance of the printer. Similarly, if the printer is not positioned with a particular orientation, such as the printer not being positioned on a substantially level surface, the printer may have a physical condition (e.g., being off of a desired or designed axis) that negatively impacts the performance of the printer.

FIG. 1 is a diagram of an example implementation 100 associated with a printer optimization model described herein. As shown in FIG. 1, example implementation 100 includes a printer management system and one or more reference monitoring systems that may include a printer, a user device, and an image capture device (e.g., a camera or other type of imager). One or more of the printers of the reference monitoring systems may include a media sensor that is configured to enable the printer and/or the management device to authenticate media associated with printing operation. As shown, one or more of the printers may include a printer environment sensor that is configured to measure and/or provide a sensor measurement associated with a sensed condition of an environment of the printer (and/or a physical condition of the printer). These devices are described in more detail below in connection with FIG. 4 and FIG. 5.

In example implementation 100, the printer management system includes a reference data structure, a feature extraction model, and a printer optimization model. As described herein, the printer management system (and/or another associated system) may train the printer optimization model based on historical printing operations performed by one or more of the printers of the reference monitoring systems, types of media that received content via the historical printing operations, sensor measurements associated with conditions of the printers that performed the respective historical printing operations, and/or images of content printed via the historical printing operations.

As shown in FIG. 1, and by reference number 110, the printer management system receives reference data. The reference data may include print data associated with historical printing operations performed by the printers, image data associated with reference images from the image capture devices that depict printed content from the historical printing operations, media data associated with a type of media involved in the printing operations, environment data associated with one or more conditions of the environments (e.g., ambient conditions of environments of the printers during the printing operations and/or physical conditions of the printers during the printing operations) of the printers, and/or corresponding printer statuses of the printers. The printers of the printer monitoring systems may be associated with one another based on having a same type of printhead, being a same type of printer, being configured to perform printing operations within a particular geographical region, or being associated with a same entity (e.g., a manufacturer of the printers and/or a same service provider that provides a service associated with the printers).

In some implementations, the image data may include a grade associated with a print quality of content printed during a historical printing operation. The grade may have been assigned by a user of the user device and/or automatically assigned by a quality control system that is configured to monitor performances of the one or more printers. In some implementations, the reference images (or a subset of the references images) may depict content associated with and/or that includes one or more printing anomalies. In this way, the reference data may indicate information associated with printing anomalies identified in the printed content (e.g., to permit the feature extraction model to identify features associated with the image data, resistance measurements, printing anomalies, and/or printer statuses, as described elsewhere herein).

The media data may include information associated with the media that was involved in the printing operations. For example, the media data may include or identify a type of media, a dimension of the media (e.g., a thickness, a width, a length, or the like), a shape of the media, an authentication technique used to identify the type of media, an identifier of the media, a configuration of the media (e.g., whether on a media roll, on individual sheets, in a cartridge, or the like) and/or whether the type of media was able to be identified or authenticated. Additionally, or alternatively, the media data may indicate whether the media matched a designated media type that was to be used in association with the historical printing operations.

The environment data may include sensor measurements associated with an ambient condition and/or a physical condition of a printer. For example, a sensor measurement may indicate a temperature of a physical environment of the printer during a printing operation, a humidity of the physical environment during the printing operation, and/or an atmospheric pressure of the physical environment during the printing operation, among other examples. Additionally, or alternatively, the sensor measurement may indicate position information associated with the printer. For example, the sensor measurement may indicate a location of the printer (e.g., relative to the physical environment and/or a geolocation of the printer) and/or an orientation of the printer (e.g., based on Newtonian parameters measured by a sensor, such as a gyroscope, a compass, a level, and/or an accelerometer).

The printer statuses may indicate usage history associated with the printer and/or a component of the printer, such as a printhead, a platen, or other component of the printer that may require repairs or replacement over the useful life of the printer. Accordingly, the printer statuses may indicate whether one or more printers of the reference monitoring systems include or are associated with performance of a threshold quantity of printing operations (e.g., indicating whether the printers have a certain level of use), usage for a threshold length of time (e.g., indicating whether the printers are relatively old or new), a certain type of printer, a certain type of use, a certain make/model/manufacture, and/or an issue associated with a certain component of the printer, among other examples. The printer statuses may be received from the printers (e.g., based on being configured to log and/or track printing operations or usage, based on the printers experiencing an error within a threshold time period after performing the historical printing operations, or the like). Additionally, or alternatively, the printer statuses may be indicated by a user via the management device (e.g., in association with a supervised learning technique). The printer statuses may identify one or more types of printing issues (or errors) experienced by the printers during respective time periods during which the historical printing operations were performed. For example, such printing issues may include faulty printing elements, misaligned printheads or other components of the printer, wrinkled printing media that received the printed content, and/or development of dust or other printing inhibitors, among other examples.

As further shown in FIG. 1, and by reference number 120, the printer management system sorts the reference data. For example, the printer management system may sort the reference data according to printer quality identified or determined from the image data associated with the printed content (e.g., the image depicting the printed content and/or a grade assigned to the printed content). The printer management system may sort the reference data into a set that indicates a first subset of the historical printing operations that resulted in relatively high-quality content and a second subset of the historical printing operations that resulted in relatively low-quality content. In this way, the printer management system may permit the feature extraction model to efficiently extract features associated with the media data and/or the environment data for relatively low-quality content and/or features associated with the media data and/or environment data for relatively high-quality content.

In some implementations, the printer management system may sort the reference data according to one or more subsets of the reference data. More specifically, the printer management system may sort the reference data based on certain conditions associated with the printers. Accordingly, if the reference data is associated with multiple printers that performed printing operations under various temperature conditions, the printer management system may sort the reference data into a first set associated with a first set of printers that performed printing operations within a first temperature range, a second set of printers that performed printing operations within a second temperature range, a third set of printers that performed printing operations within a third temperature range, and so on. Similar sets can be sorted according to other ambient conditions and/or certain physical conditions (e.g., substantially level, off-axis relative to being level, and/or in a certain location or area). In some cases, the reference data may be sorted into a first set associated with printers that have been used in no more than a threshold quantity of print operations (or for no longer than a length of time), and a second set associated with a second set of printers with printheads that have been used in more than the threshold quantity of print operations (or for longer than the threshold length of time). In such a case, the printer management system may sort the reference data according to the printer statuses of the reference data including or indicating the respective historical printhead statuses associated with the respective printheads of the printers during the historical printing operations.

As further shown in FIG. 1, and by reference number 130, the printer management system (e.g., via the feature extraction model) identifies features associated with printing operations and/or printing conditions. For example, the features may be associated with certain types of media data, certain types of environment data, and/or certain print quality. The feature extraction model may be configured to recognize a trend and/or a pattern associated with certain printing anomalies, media types as identified in the media data, and/or sensor measurements as identified in the environment data being associated with certain printer statuses.

In some implementations, the feature extraction model may be associated with a machine learning model (e.g., a support vector machine, a regression model, a neural network, a clustering model, a prediction model, and/or a generator model). For example, the printer management system may use a classification model (e.g., a clustering model and/or a regression model) to classify the image data, media data, and/or environment data into a particular class. Relative to a printing issue, a first class may be associated with content that was printed by a printer having a first printing issue or prior to the printer having the first printing issue, a second class may be associated with content that was printed by a printer having a second printing issue or prior to the printer having the second issue, and so on.

In some implementations, the feature extraction model may be configured to map images, media types, and/or sensor measurements from one or more sensors associated with the printer to a certain printing anomaly identified in content that is printed by one of the printers. For example, the feature extraction model may include or be associated with a computer vision model (e.g., a convolutional neural network) that is configured to classify the image data into a particular class. The image data may be associated with reference images that depict content relating to certain printing anomalies. A first class may be associated with content that was printed with a first type of printing anomaly, a second class may be associated with content that was printed with a second type of printing anomaly, and so on. In some implementations, to detect anomalies or other features on the images, the computer vision model may utilize an image recognition technique (e.g., an Inception framework, a ResNet framework, a Visual Geometry Group (VGG) framework, and/or the like), and/or an object detection technique (e.g., a Single Shot Detector (SSD) framework, a You Only Look Once (YOLO) framework, and/or the like), among other examples. Types of printing anomalies may include a degradation associated with lightened print or faded print, content distortion, broken or disjointed lines (e.g., lines associated with a barcode), low contrast content, print/mark inconsistency, grid non-uniformity, axial non-uniformity, and/or a poor or low content grade (e.g., a content grade, perhaps for a barcode, that is below a certain threshold associated with a standard).

The feature extraction model may output and/or provide feature data to the printer optimization model. The feature data may include sets of reference media types, reference sensor measurements, and/or reference printing anomalies that are determined to be associated with certain printer statuses and/or sets of reference media types or conditions, and/or certain media types and/or conditions that are determined to be associated with certain printing anomalies that are identified in printed content.

As further shown in FIG. 1, and by reference number 140, the printer management system trains the printer optimization model. For example, the printer management system may train the printer optimization model based on the identified features associated with the printing anomalies, the identified media types and/or authenticated media types, the indicated conditions (e.g., as determined from sensor measurements from sensors associated with the printers), and/or the print data of printing instructions being associated with certain printer statuses and/or certain issues that can be addressed via a reconfiguration of setting of the printer.

The printer optimization model may be trained to identify certain conditions (e.g., from sensor measurements) that are associated with and/or correspond to particular printing anomalies that are indicative of a printer experiencing an issue during a printing operation. For example, the reference data may indicate that printing operations performed by printers that were in an environment with a relatively high temperature are indicative of the printer having a printhead likely experiencing a resistance issue during a printing operation. In such a case, the printer optimization model may be trained to associate the relatively high temperature with the printhead experiencing a resistance issue.

The printer optimization model may be configured to identify various types of issues that are likely to cause the printer to print unreadable content during subsequent printing operations (e.g., subsequent printing operations performed within a threshold time period and/or subsequent printing operations that would be within a next threshold quantity of printing operations). For example, the printer management system may train the machine learning model based on the reference data associated with historical printing operations (e.g., reference images and/or corresponding reference media types and/or reference sensor measurements). The certain types of issues may include printhead related issues (e.g., damage or wear on a printing element of a printhead), platen related issues (e.g., damage or wear on a platen), pixel failures, traction degradation, sensor errors, user-related intervention events, service-related intervention events, registration related issues, and/or media tracking issues, among other issues. In some implementations, the printer optimization model may be trained to identify (e.g., using a computer vision model) patterns and/or trends associated with performances of historical printing operations of a printer (e.g., based on timestamp data, location data, and/or other metadata associated with the historical printing operations).

In some implementations, the printer management system may receive the printer optimization model from another system after the printer management system is trained. For example, the other system may obtain the reference data associated with the one or more printers and/or the historical printing operations and provide the printer optimization model to the printer management system to permit the printer management system to utilize the printer optimization model. Additionally, or alternatively, the printer optimization model may be configured to be locally installed on a printer and/or a user device associated with the printer, as described elsewhere herein. The printer optimization model may be trained and/or utilized as described in more detail in connection with FIG. 3.

The printer optimization model may learn and/or maintain sets of reference media data and/or reference sensor measurements that are associated with a printer status that is indicative of whether the printer is likely to experience an issue that could affect a quality of subsequently printed content. In this way, the printer optimization model may be trained and/or configured to be used to analyze image data, media data, and/or sensor measurements within environment data to monitor and/or determine a status of a printer and/or determine a configuration for a printing operation that is to be performed by the printer (as further described at least in connection with FIG. 2).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
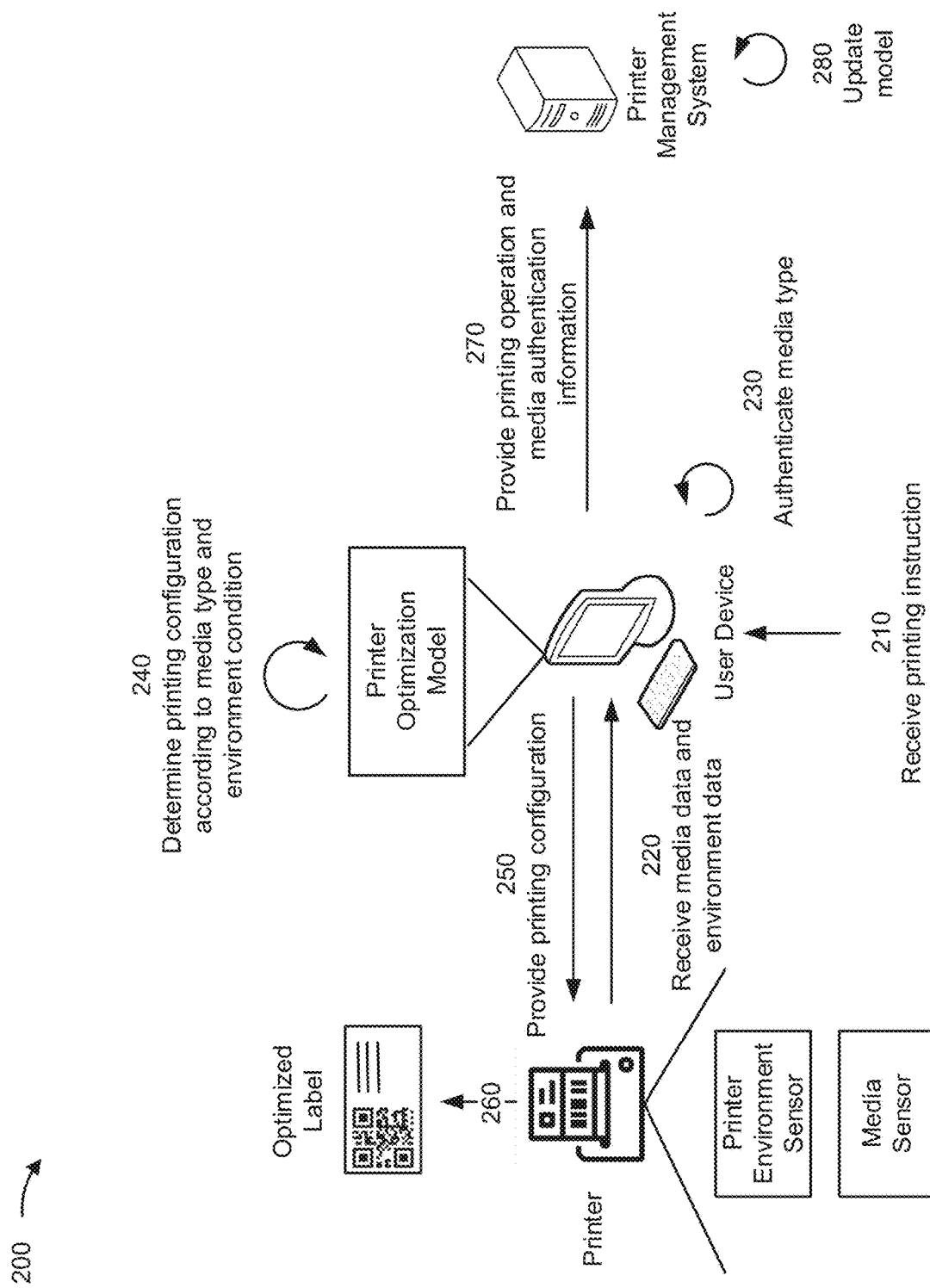
FIG. 2 is a diagram of an example implementation of dynamically configuring a printer for a printing operation described herein.

FIG. 2 is a diagram of an example implementation 200 associated with dynamically configuring a printer for a printing operation. As shown in FIG. 2, example implementation 200 includes a user device, a printer, and a printer management system. These devices are described in more detail below in connection with FIG. 4 and FIG. 5. As shown, the user device may include a printer optimization model that is trained as described elsewhere herein. The printer may include a media sensor and a print environment sensor. The media sensor may include an optical sensor, image sensor, or any other suitable sensor that is capable of determining and/or authenticating a type of media installed within the printer and/or that is to receive content via a printing operation. The printer environment may include one or more sensors, such as a temperature sensor, a humidity sensor, and/or a pressure sensor.

As shown in FIG. 2, and by reference number 210, the user device receives a printing instruction. The printing instruction may include and indicate print data associated with a printing operation that is to be performed by the printer to print content to media. In some implementations, the printing instruction may identify a certain type of media that is to be utilized for a printing operation.

As further shown in FIG. 2, and by reference number 220, the user device receives media data and environment data from the printer. For example, the user device may receive the media data from a media sensor and the environment data from a printer environment sensor. The media data and/or the environment data may be received within a communication from the printer (e.g., a response to a query from the user device to provide the media data and/or the environment data).

The environment data may include information that identifies an ambient condition of a physical environment of the printer. The ambient condition may include a temperature and/or a humidity of the environment. Correspondingly, the printer environment sensor may be a temperature sensor and/or a humidity sensor associated with the printer. The printer environment sensor may be a sensor of the printer. For example, the printer environment sensor may be mounted to the printer to permit the printer environment sensor to sense the ambient condition within the physical environment. Additionally, or alternatively, the printer environment sensor may be a sensor of the user device and/or another device that is capable of indicating an ambient condition of the physical environment.

The printer environment sensor may be a sensor that is configured to sense a physical condition of the printer (e.g., whether the printer is substantially level or off-axis relative to being level). In such a case, the user device may receive an orientation measurement that indicates an orientation of the printer.

As further shown in FIG. 2, and by reference number 230, the user device authenticates a media type associated with the media. For example, the user device may authenticate the media type based on an analysis of the media data that is captured by the media sensor in association with the media that is loaded into the printer. The user device may authenticate the media type by comparing the media type to a designated media type that is identified in the printing instruction. The user device may authenticate the media type based on at least one of a marking included on the media (e.g., a marking that is mapped to and/or associated with the type of media) and/or a physical characteristic of the media (e.g., a hole or notch in the media that is indicative of the type of media).

As further shown in FIG. 2, and by reference number 240, the user device determines a printing configuration according to the media type and the environment condition. For example, the user device may utilize the printer optimization model to determine the printing configuration based on identifying the media type from the authentication of the media type and/or a sensor measurement identified in the environment data. The printing configuration may indicate one or more settings for the printer (e.g., printhead settings, a setting for certain printing elements of the printhead, a platen setting, or the like) that should be set, configured, and/or adjusted based on the printer optimization model processing the media data and/or the environment data for the printing operation. In this way, the printer optimization model may dynamically configure the printer for printing operations to optimize a performance of the printing operation (e.g., according to a configuration of the printer optimization model). In some implementations, the printer optimization model may be trained to indicate and/or determine the printing configuration as described elsewhere herein.

To permit the user device to use the printer optimization model to determine a printer status of a printer, diagnose potential issues with printers based on the printer status, and/or determine a printing configuration according to the printer statuses and/or diagnosed issues, the user device may have received (e.g., downloaded) the printer optimization model from the printer management system (e.g., after the printer optimization model was trained as described elsewhere herein) and installed the printer optimization model within the user device. In some implementations, the printer optimization model may be installed locally within the printer to permit the printer to utilize the printer optimization model to determine a printing configuration as described herein.

While a certain printer may be able to perform a printing operation under certain conditions using a first type of media, the same printer, under the same conditions, may be unable to perform a printing operation using a second type of media that is different from the first type. The printer optimization model may be trained to identify such conditions and/or relationships between media types and conditions for a printer. Accordingly, prior to determining a printing configuration, the printer optimization model may verify that the printer is capable of performing a printing operation based on the media type and/or conditions of the printer for the printing operation. For example, the printing configuration may be determined based on a determination that the printer is capable of performing the printing operation according to the environment data indicating that an orientation of the printer is within a threshold range (e.g., level or within a threshold degree of level) that enables the printer to perform the printing operation using the specific type of media that is loaded into the printer and/or that has been authenticated.

In some implementations, the printer optimization model may be configured to select a certain printing configuration in order to optimize a usage of the printer. For example, the printer optimization model may be configured to reduce and/or minimize damage to a particular component of the printer due to certain conditions of the printer and/or the environment. In this way, the printing operation may be configured to extend the useful life of the printer relative to other systems that do not dynamically determine a printing configuration for a printing operation, as described herein.

In this way, the user device may determine a printing configuration to cause the printer to perform the printing operation according to the printing configuration.

As further shown in FIG. 2, and by reference number 250, the user device provides a printing configuration to the printer. For example, the user device may provide a notification and/or a message that causes the printer to perform the printing operation according to the printing configuration. The notification and/or message may indicate one or more configurable settings of the printer that may optimize a quality of printed content under the conditions of the printer and/or based on the type of the media.

As further shown in FIG. 2, and by reference number 260, the printer prints an optimized label. For example, the printer may print the optimized label based on receiving the printing configuration from the user device and/or based on setting, configuring, and/or adjusting one or more configurable settings associated with one or more components of the printer. More specifically, according to the printing configuration, the printer may set or adjust a resistance of one or more printing elements of a printhead, the printer may set or adjust a pressure applied toward a platen of the printer, the printer may set or adjust an alignment of a feeder component of the printer, among other examples.

As further shown in FIG. 2, and by reference number 270, the user device may provide printing operation information and/or media authentication information to the printer management system. For example, the user device may provide and/or report information associated with the printing operation and/or the media authentication in order to permit the printer management system to track and/or maintain information associated with the printing operations and/or media authentications.

As further shown in FIG. 2, and by reference number 280, the printer management system may update a model associated with the printer management system. For example, the printer management system may update the printer optimization model and/or an authentication model that is configured to authenticate the media as described herein.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
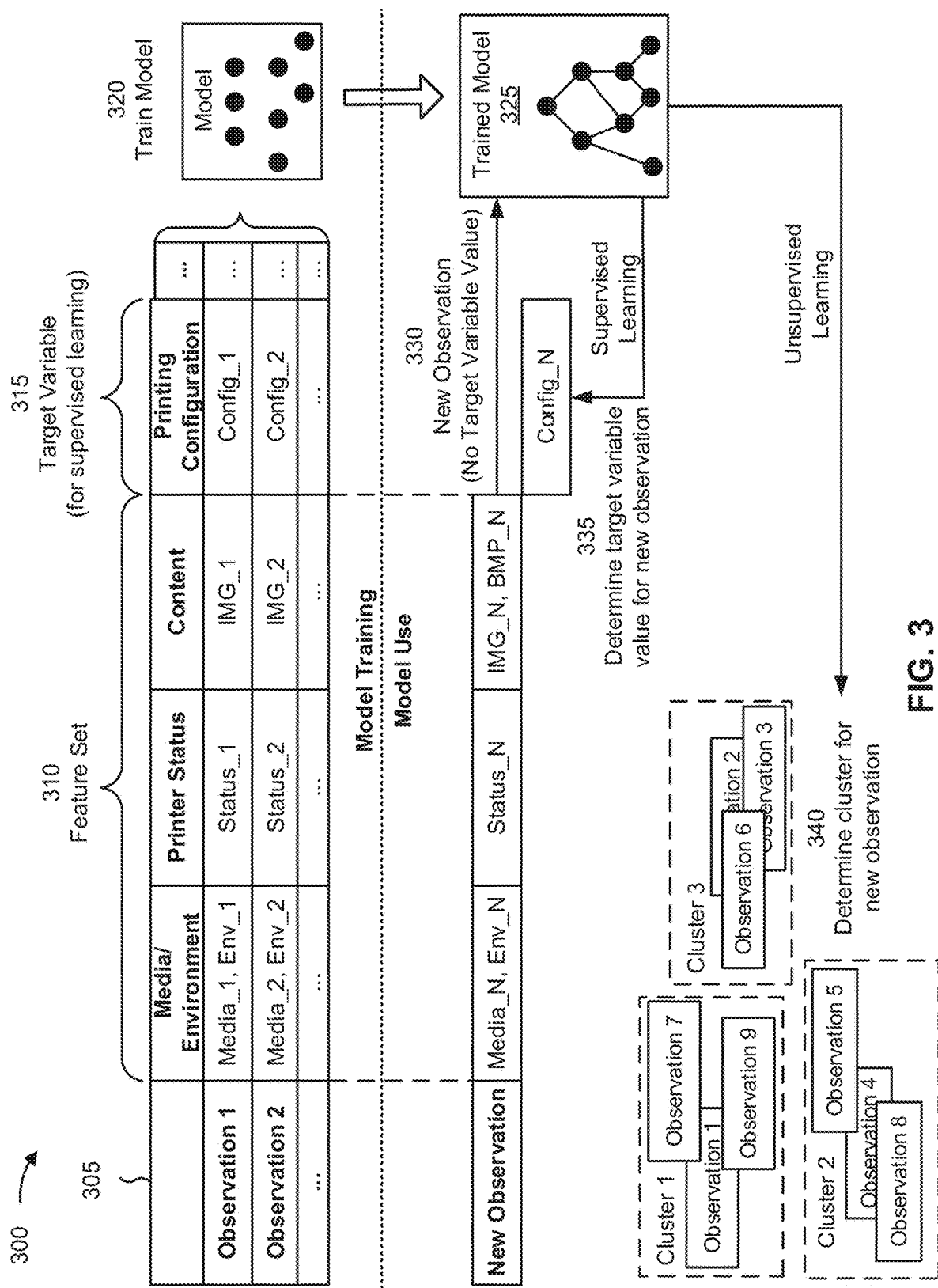
FIG. 3 is a diagram illustrating an example of training and using a machine learning model described herein.

FIG. 3 is a diagram illustrating an example 300 of training and using a machine learning model in connection with dynamically configuring a printer for a printing operation. The machine learning model training and usage described herein may be performed using a machine learning system. The machine learning system may include or may be included in a computing device, a server, a cloud computing environment, or the like, such as the printer management system described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from one or more devices of reference monitoring systems, such as one or more image capture devices, one or more printers, and/or one or more management devices, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a media sensor (or media authenticator) of the printer, a printer environment sensor of the printer, the printer, an image capture device, and/or a management device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of media/environment, a second feature of a printer status, a third feature of content, and so on. As shown, for a first observation, the first feature may have a value of Media_1, Env_1 (e.g., corresponding to data and/or information associated with a media type and a condition of the printer in the first observation), the second feature may have a value of Status_1 e.g., corresponding to information associated with the printer of the first observation, such as a status of a component of the printer, a usage history of the printer, among other examples), the third feature may have a value of IMG_1 (e.g., corresponding to an image depicting content printed in association with a printing operation of the first observation), and so on. These features and feature values are provided as examples, and the features may differ in other examples. For example, the feature set may include one or more of the following features: print data associated with a print instruction associated with the printing operation, timing associated with the printing operation, a location associated with the printer, an entity associated with the printer, a usage history associated with the printer, and/or a type of the printer, among other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is printing configuration, which has a value of Config_1 for the first observation (e.g., corresponding to settings of the printer used to perform a printing operation of the first observation).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of a media/environment, a second feature of a printer status, a third feature of content, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of Config_N for the target variable of printing configuration for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, to adjust a condition of the environment (e.g., to be within a desirable or operable range associated with a design of the printer) and/or to adjust a setting of the printer. The first automated action may include, for example, automatically adjusting a setting of the printer to optimize a performance characteristic of the printer (e.g., to achieve optimal print quality, to extend a useful life of the printer and/or a component of the printer, and so on).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a cluster that indicates that the printer experienced a particular issue during a printing operation performed under certain conditions and/or utilizing a certain type of media), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster that indicates that the printer did not experience a particular issue during a printing operation performed under certain conditions and/or certain types of media), then the machine learning system may provide a second (e.g., different) recommendation (e.g., a recommendation to retrain the machine learning model) and/or may perform or cause performance of a second (e.g., different) automated action, such as automatically retrain the machine learning model.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to dynamically determine a printing configuration for a printing operation and/or identifying printing issues associated with a printer that performed a printing operation. The machine learning system enables recognition and/or identification of tens, hundreds, thousands, or millions of features and/or feature values for tens, hundreds, thousands, or millions of observations, thereby increasing accuracy and consistency and reducing delay associated with determining optimal printing configurations and/or identifying printing issues associated with printing operations relative to requiring computing resources to be allocated for tens, hundreds, or thousands of operators to manually determine optimal printing configurations and/or identify printing issues associated with printing operations using the features or feature values.

As indicated above, FIG. 3 is provided as an example. Other examples may differ from what is described in connection with FIG. 3.

Figure 4:
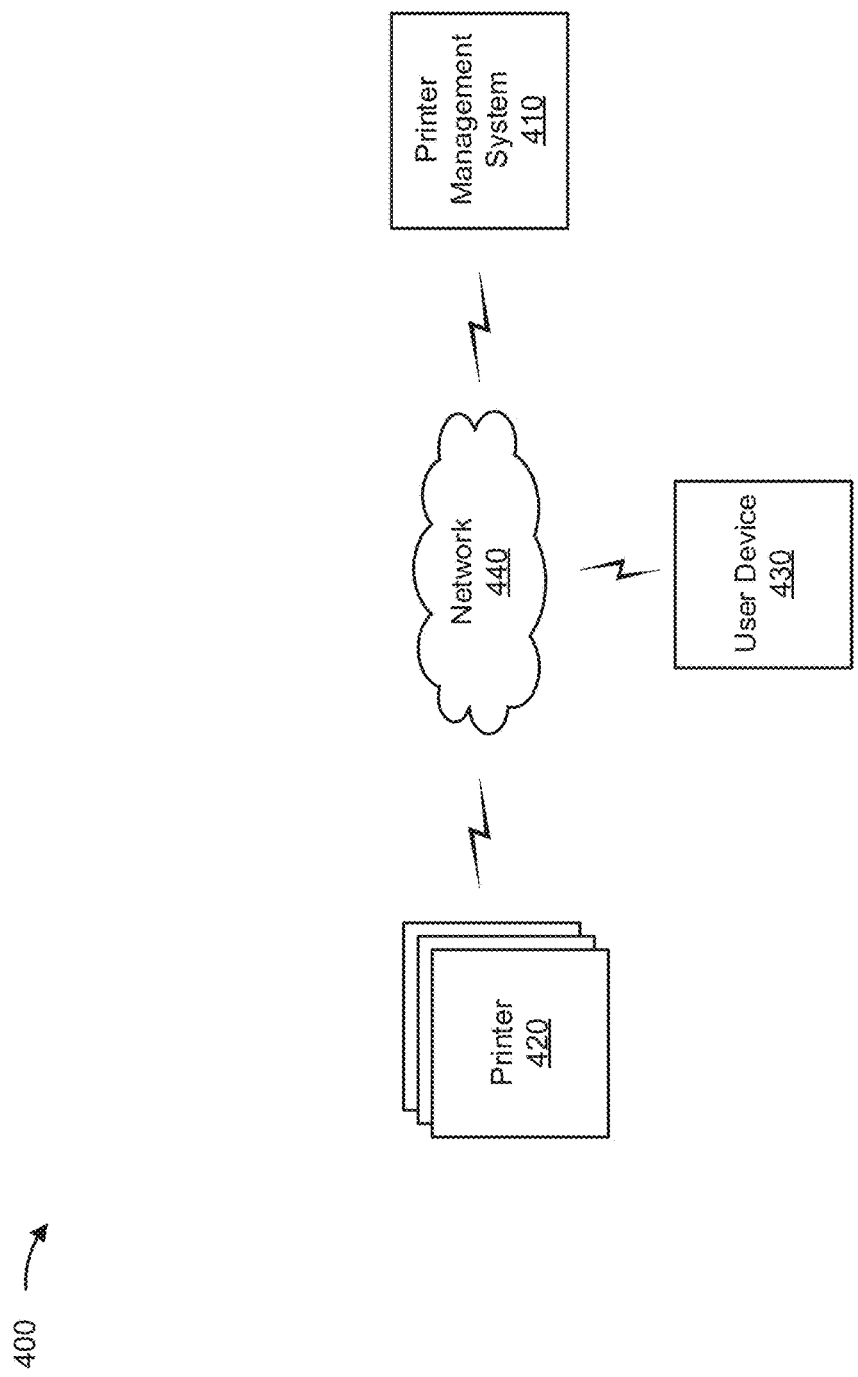
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a printer management system 410, one or more printers 420, a user device 430, and a network 490. Devices of environment 400 may interconnect via wired connections, wireless connections, or a combination of wired and wireless connections.

The printer management system 410 includes one or more devices capable of receiving, generating, storing, processing, providing, and/or routing information associated with utilizing a model to dynamically determining a printing configuration according to a media type and/or a condition of a printer, as described elsewhere herein. The printer management system 410 may include a communication device and/or a computing device. For example, the printer management system 410 may include a server, such as an application server, a client server, a web server, a database server, a host server, a proxy server, a virtual server (e.g., executing on computing hardware), or a server in a cloud computing system. In some implementations, the printer management system 410 includes computing hardware used in a cloud computing environment.

The printer 420 includes one or more devices capable of receiving, generating, storing, processing, and/or providing information associated with identifying a media type and/or a condition of an environment, as described elsewhere herein. The printer 420 may include a communication device and/or a computing device that enables communication with one or more of the other devices of environment 400. In some implementations, the printer 420 may include one or more sensors for identifying and/or authenticating media. Additionally, or alternatively, the printer 420 may include one or more sensors for identifying one or more conditions of an environment of the printer 420 and/or of a position of the printer 420.

The user device 430 includes one or more devices capable of receiving, generating, storing, processing, and/or providing information associated with dynamically determining a printing configuration, as described elsewhere herein. The user device 430 may include a communication device and/or a computing device. For example, the user device 430 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 440 includes one or more wired and/or wireless networks. For example, the network 440 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 440 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
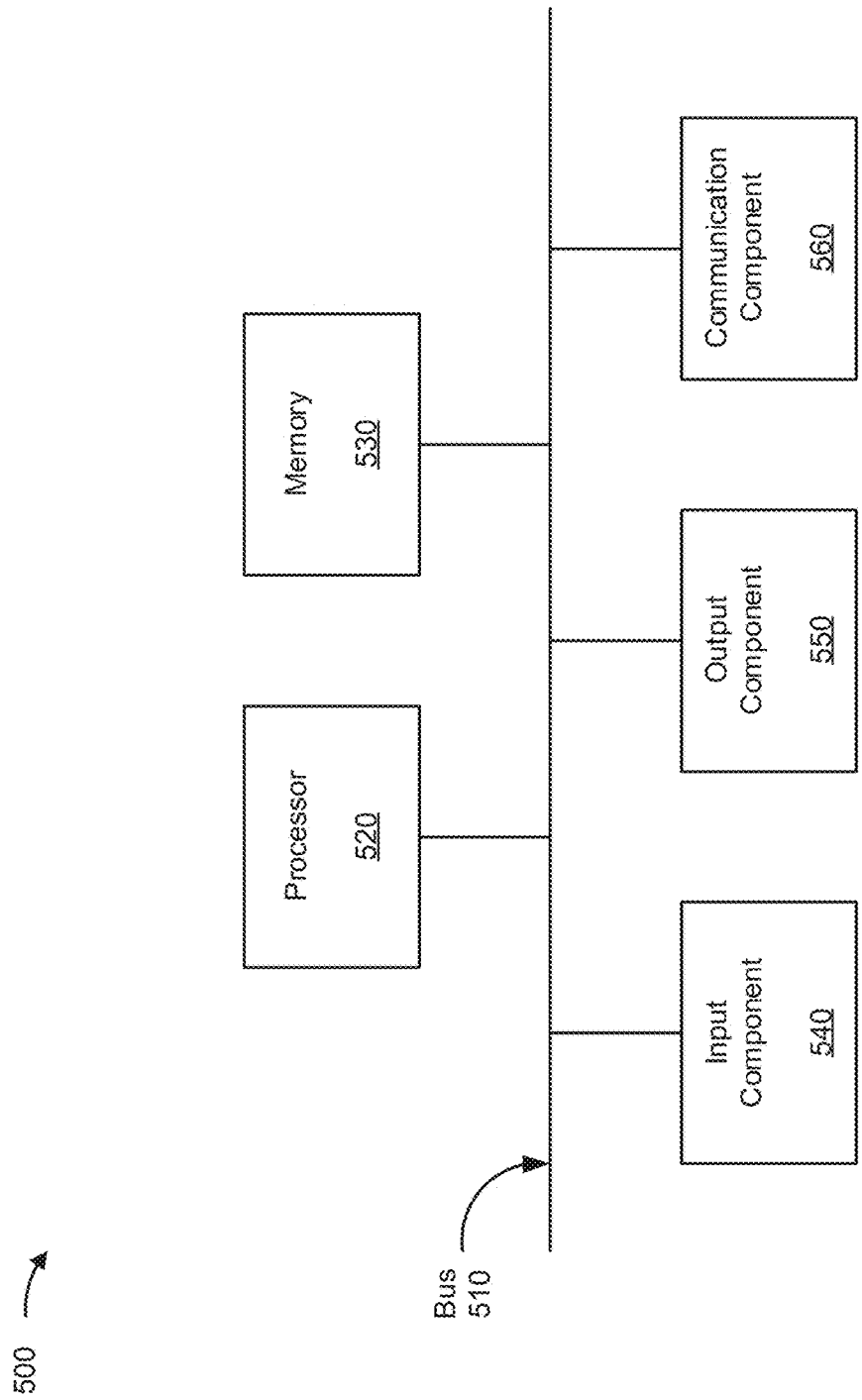
FIG. 5 is a diagram of example components of one or more devices of FIG. 4.

FIG. 5 is a diagram of example components of a device 500, which may correspond to the printer management system 410, the printer 420, and/or the user device 430. In some implementations, the printer management system 410, the printer 420, and/or the user device 430 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
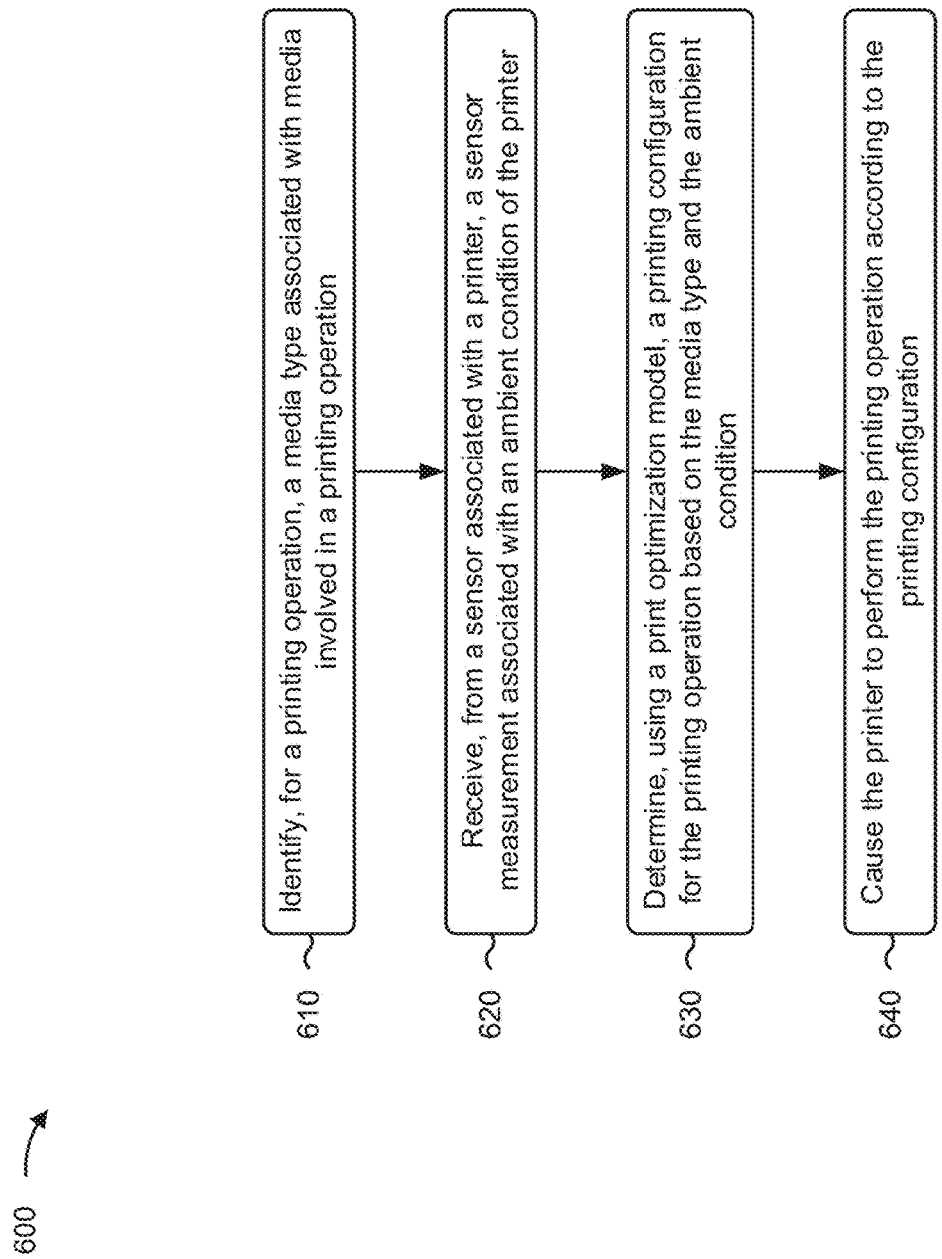
FIG. 6 is a flowchart of an example process relating to dynamically determining a printing configuration of a printer for a printing operation.

FIG. 6 is a flowchart of an example process 600 associated determining a printing configuration of a printer for a printing operation. In some implementations, one or more process blocks of FIG. 6 may be performed by a user device (e.g., the user device 430). In some implementations, one or more process blocks of FIG. 6 may be performed by another device or a group of devices separate from or including the user device, such as a printer management system (e.g., the printer management system 410) and/or a printer (e.g., the printer 420). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include identifying, for a printing operation, a media type associated with media involved in the printing operation (block 610). For example, the user device may identify the media type associated with media involved in the printing operation, as described above.

The user device may authenticate, using an optical analysis of the media, the media type based on a designated media type of a printing instruction associated with the printing operation and at least one of a marking included on the media or a physical characteristic of the media. The printing configuration may be determined based on the media type being authenticated.

As further shown in FIG. 6, process 600 may include receiving, from a sensor, a sensor measurement associated with an ambient condition of the printer (block 620). For example, the user device may receive, from a sensor, a sensor measurement associated with an ambient condition of the printer, as described above.

In some implementations, the sensor may include a temperature sensor associated with the printer and the ambient condition may be a temperature in a physical environment of the printer that is measured by the temperature sensor. Additionally, or alternatively, the sensor may include a humidity sensor associated with the printer and the ambient condition may be a humidity of a physical environment of the printer that is measured by the humidity sensor. The printer may include the sensor, and the sensor measurement may be received via a communication from the printer.

As further shown in FIG. 6, process 600 may include determining, using a print optimization model, a printing configuration for the printing operation based on the media type and the ambient condition (block 630). For example, the user device may determine, using a print optimization model, a printing configuration for the printing operation based on the media type and the ambient condition, wherein the print optimization model is trained based on reference data associated with historical printing operations associated with one or more printers, wherein the reference data includes reference configurations associated with the historical printing operations, respective media types of media used in the historical printing operations, and corresponding ambient conditions of the one or more printers during the historical printing operations, as described above. In some implementations, the print optimization model is trained based on reference data associated with historical printing operations associated with one or more printers, wherein the reference data includes reference configurations associated with the historical printing operations, respective media types of media used in the historical printing operations, and corresponding ambient conditions of the one or more printers during the historical printing operations.

In some implementations, the user device may receive, from the sensor, an orientation measurement that indicates an orientation of the printer. The printing configuration may be determined based on a determination that the printer is capable of performing the printing operation according to the orientation indicated by the orientation measurement.

As further shown in FIG. 6, process 600 may include causing the printer to perform the printing operation according to the printing configuration (block 640). For example, the user device may cause the printer to perform the printing operation according to the printing configuration, as described above.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for configuring a network-connected device, comprising:
   identifying an operation to be performed by a network-connected device;
   receiving, from a sensor, a sensor measurement associated with a condition of at least one of the network-connected device or an environment within which the network-connected device resides;
   predicting, using a trained machine learning model, an occurrence of an operational issue of the network-connected device in response to receiving an input that includes the operation to be performed and the sensor measurement;
   determining a configuration of the network-connected device for the operation in response to predicting the occurrence of the operational issue;
   configuring the network-connected device with the configuration to correct the operational issue; and
   causing the network-connected device to perform the operation according to the configuration.

2. The method of claim 1, wherein the trained machine learning model is trained to predict the occurrence of the operational issue based on reference data associated with historical operations associated with like devices to the network-connected device, the reference data includes reference configurations associated with the historical operations and corresponding conditions of the like device during the historical operations.

3. The method of claim 1, wherein the sensor is a temperature sensor associated with the network-connected device and the condition is a temperature of the network-connected device or of the environment that is measured by the temperature sensor.

4. The method of claim 1, wherein the sensor is a humidity sensor associated with the device and the condition is a humidity within the network-connected device or the environment that is measured by the humidity sensor.

5. The method of claim 1, wherein the condition measured by the sensor is a physical condition of the network-connected device and the configuration is determined based on a determination that the network-connected device is capable of performing the operation based on the physical condition of the network-connected device.

6. The method of claim 1, wherein the network-connected device is a printer and the operational issue includes at least one of damage or wear on a printing element of a printhead, damage or wear on a platen, printhead pixel failures, traction degradation, sensor errors, user-related intervention events, service-related intervention events, registration related issues, or media tracking issues.

7. The method of claim 1, wherein the network-connected device is a printer and the configuration provides one or more settings for the network-connected device, the one or more settings include at least one of printhead settings, a setting for certain printing elements of the printhead, or a platen setting.

8. The method of claim 1, wherein the network-connected device is a printer and the configuration provides one or more settings for the network-connected device, the one or more settings include a resistance of one or more printing elements of a printhead, a pressure applied toward a platen of the printer, an alignment of a feeder component of the printer.

9. A system, comprising:
   one or more memories; and
   one or more processors, coupled to the one or more memories, configured to:
      identify an operation to be performed by a network-connected device;
      receive, from a sensor, a sensor measurement associated with a condition of at least one of the network-connected device or an environment within which the network-connected device resides;
      predict, using a trained machine learning model, an occurrence of an operational issue of the network-connected device in response to receiving an input that includes the operation to be performed and the sensor measurement;
      determine a configuration of the network-connected device for the operation in response to predicting the occurrence of the operational issue;
      configure the network-connected device with the configuration to correct the operational issue; and
      cause the network-connected device to perform the operation according to the configuration.

10. The system of claim 9, wherein the trained machine learning model is trained to predict the occurrence of the operational issue based on reference data associated with historical operations associated with like devices to the network-connected device, the reference data includes reference configurations associated with the historical operations and corresponding conditions of the like device during the historical operations.

11. The system of claim 9, wherein the sensor is a temperature sensor associated with the network-connected device and the condition is a temperature of the network-connected device or of the environment that is measured by the temperature sensor.

12. The system of claim 9, wherein the sensor is a humidity sensor associated with the device and the condition is a humidity within the network-connected device or the environment that is measured by the humidity sensor.

13. The system of claim 9, wherein the condition measured by the sensor is a physical condition of the network-connected device and the configuration is determined based on a determination that the network-connected device is capable of performing the operation based on the physical condition of the network-connected device.

14. The system of claim 9, wherein the network-connected device is a printer and the operational issue includes at least one of damage or wear on a printing element of a printhead, damage or wear on a platen, printhead pixel failures, traction degradation, sensor errors, user-related intervention events, service-related intervention events, registration related issues, or media tracking issues.

15. The system of claim 9, wherein the network-connected device is a printer and the configuration provides one or more settings for the network-connected device, the one or more settings include at least one of printhead settings, a setting for certain printing elements of the printhead, or a platen setting.

16. The system of claim 9, wherein the network-connected device is a printer and the configuration provides one or more settings for the network-connected device, the one or more settings include a resistance of one or more printing elements of a printhead, a pressure applied toward a platen of the printer, an alignment of a feeder component of the printer.

17. A non-transitory machine-readable medium storing a set of instructions, the set of instructions comprising:
one or more instructions that, when executed by one or more processors of a device, cause the device to:
identify an operation to be performed by a network-connected device;
receive, from a sensor, a sensor measurement associated with a condition of at least one of the network-connected device or an environment within which the network-connected device resides;
predict, using a trained machine learning model, an occurrence of an operational issue of the network-connected device in response to receiving an input that includes the operation to be performed and the sensor measurement;
determine a configuration of the network-connected device for the operation in response to predicting the occurrence of the operational issue;
configure the network-connected device with the configuration to correct the operational issue; and
cause the network-connected device to perform the operation according to the configuration.

18. The medium of claim 17, wherein the condition is at least one of a temperature of the network-connected device or of the environment that is measured by the temperature sensor, a humidity within the network-connected device or the environment that is measured by the humidity sensor, or a physical condition of the network-connected device, and the configuration is determined based on a determination that the network-connected device is capable of performing the operation based on the condition of the network-connected device.

19. The medium of claim 17, wherein the network-connected device is a printer and the operational issue includes at least one of damage or wear on a printing element of a printhead, damage or wear on a platen, printhead pixel failures, traction degradation, sensor errors, user-related intervention events, service-related intervention events, registration related issues, or media tracking issues.

20. The medium of claim 17, wherein the network-connected device is a printer and the configuration provides one or more settings for the network-connected device, the one or more settings include a resistance of one or more printing elements of a printhead, a pressure applied toward a platen of the printer, an alignment of a feeder component of the printer.

21. The method of claim 1, wherein the performance of the operation according to the configuration to correct the operational issue at least one of reduces a likelihood that the network-connected device experiences a severe enough issue that requires the network-connected device to be shut down or minimizes damage to a particular component of the network-connected device.

* * * * *